S. S. BROWN.
Cheese Box and Cutter.
No. 82,795.
Patented Oct. 6, 1868.
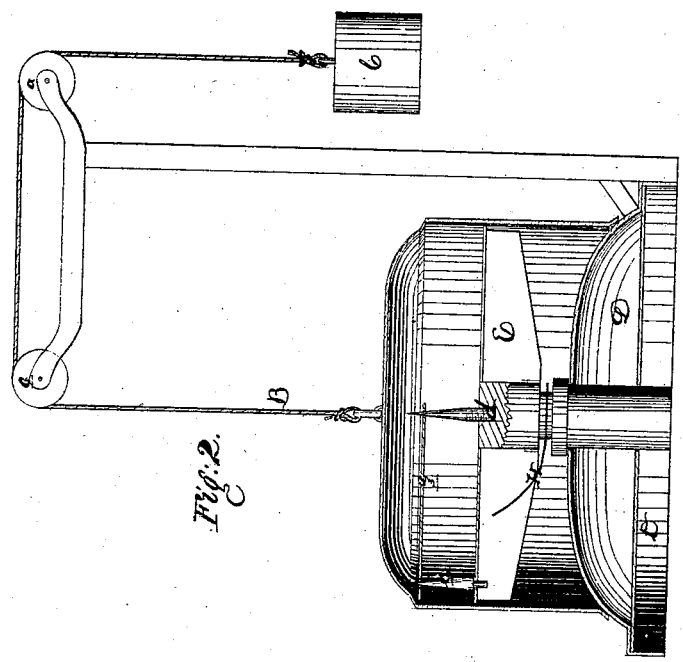
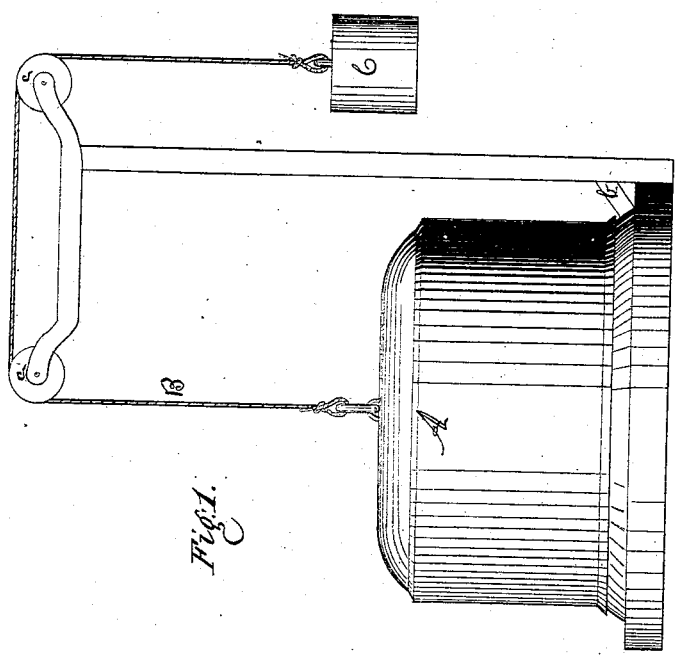
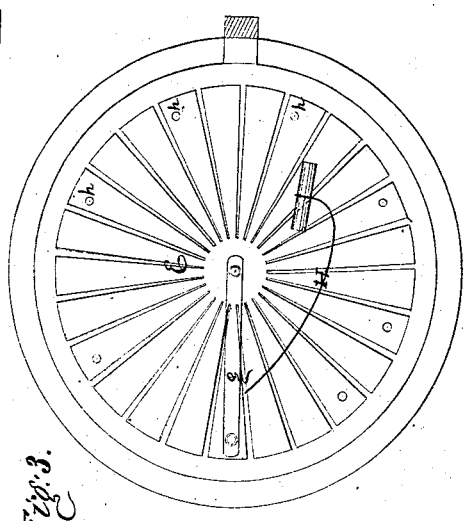
Witnesses
J. C. Smith
N. P. Chipman
Inventor
Smith S. Brown
Chipman Hosmer & Co
attys

United States Patent Office.

SMITH S. BROWN, OF WOONSOCKET, RHODE ISLAND.

Letters Patent No. 82,795, dated October 6, 1868.

---

IMPROVED CHEESE-CUTTER AND BOX.

---

The Schedule referred to in these Letters Patent and making part of the same.

---

TO ALL WHOM IT MAY CONCERN:

Be it known that I, SMITH S. BROWN, of Woonsocket, in the county of Providence, and State of Rhode Island, have invented a new and valuable Improvement in Cheese-Boxes and Cutters; and I do hereby declare that the following is a full, clear, and exact description of the construction and operation of the same, reference being had to the annexed drawings, making a part of this specification, and to the letters and figures of reference marked thereon.

The nature of my invention consists in constructing, for the use of retailers of cheese, a cover that can be easily placed over the cheese so kept for retail, to protect it from flies and the like, or can be removed therefrom by weights and pulleys. It also consists in combining, with the above-named cover, means by which the cheese can be cut into small slices, of equal size, without the use of a knife.

My cover is represented on the drawings by the letter A. It consists in a circular dish or bowl, inverted, is adapted in size to the size of the cheese to be covered; and has a staple and ring in its top to receive the cord by which it is raised.

The letter B is a cord attached to the ring last mentioned.

Letters $c$ $c$ are pulleys, over which the cord is drawn. They are adjusted on arms attached to the top of an upright stand that extends upward from the table upon which the cheese is placed.

Letter C is a weight, attached to the end of cord B, and is used in combination therewith for raising the cover.

Letter D is the table upon which all the devices rest. I usually construct it in a convex and concave form, with a flat rim near the outer surface adapted to the size of the cover. A small brace is attached to it, at the point $b$, to aid in sustaining the upright standard before mentioned.

On the convex summit of the table D, and upon and around a pivot, $d$, I adjust the cutting-table E. This table is constructed with a series of slots and flanches, extending from its periphery to a point near its centre, as shown on fig. 3, and it is made to rotate, at the will of the operator, around the pivot $d$. This pivot extends upward above the cutting-table, and is sharpened at its point so as to enable it to pass easily into the centre of the cheese.

Letter $e$ is a sharpened pin, adjusted in the top of the cutting-table, near its periphery, the office of which is to aid in holding the cheese in its place on the said table.

A guide, $g$, passes from pivot $d$ to pin $e$, in the manner represented, which serves as an aid in cutting the cheese, as hereinafter mentioned.

I make small openings in the cutting-table, as indicated by the letters $h$, in which I place the pin $e$ at will, moving it from one opening to another, as the case may require.

My cutting-device is a wire, shown on the drawings by letter H. It is fastened, at its lower end, to the outside of pivot $d$, below the table, and extends upward through any one of the slots in the revolving table the operator may desire. At its extreme upper end, I attach a handle, of wood or other suitable material.

My device is operated as follows, namely:

To place the cheese on the revolving table, I lift it directly above said table, and allow the upper end of pivot $d$ to pass into or through the centre of the cheese. As a general thing, the rim of the cheese will fall inside the pin $e$. The cover may now be loosened, and the cheese is secure.

When I desire to cut off a portion of the cheese for a customer, I raise the cover therefrom, and, after determining about the size required, I bring the cutting-wire into the slot next adjoining the pin $e$, and draw it upward. The wire is guided to the centre of the cheese by the guide $g$ and the metallic side of the slot, thereby securing a smooth and uniform cut to the section removed, as well as the section that remains. As the cheese is removed, the pin $e$ is removed also, and placed in such of the openings $h$ as the case requires.

What I claim as my invention, and desire to secure by Letters Patent, is—

A cheese-box and cutter, having tables D and E, pivot $d$, pin $e$, cover A, cutting-wire H, and guide $g$, constructed, arranged, and operating substantially as specified.

In testimony that I claim the above, I have hereunto subscribed my name, in the presence of two witnesses.

SMITH S. BROWN.

Witnesses:
FRANCIS L. O'REILLY,
GEORGE A. WILBUR.